Patented Mar. 11, 1952

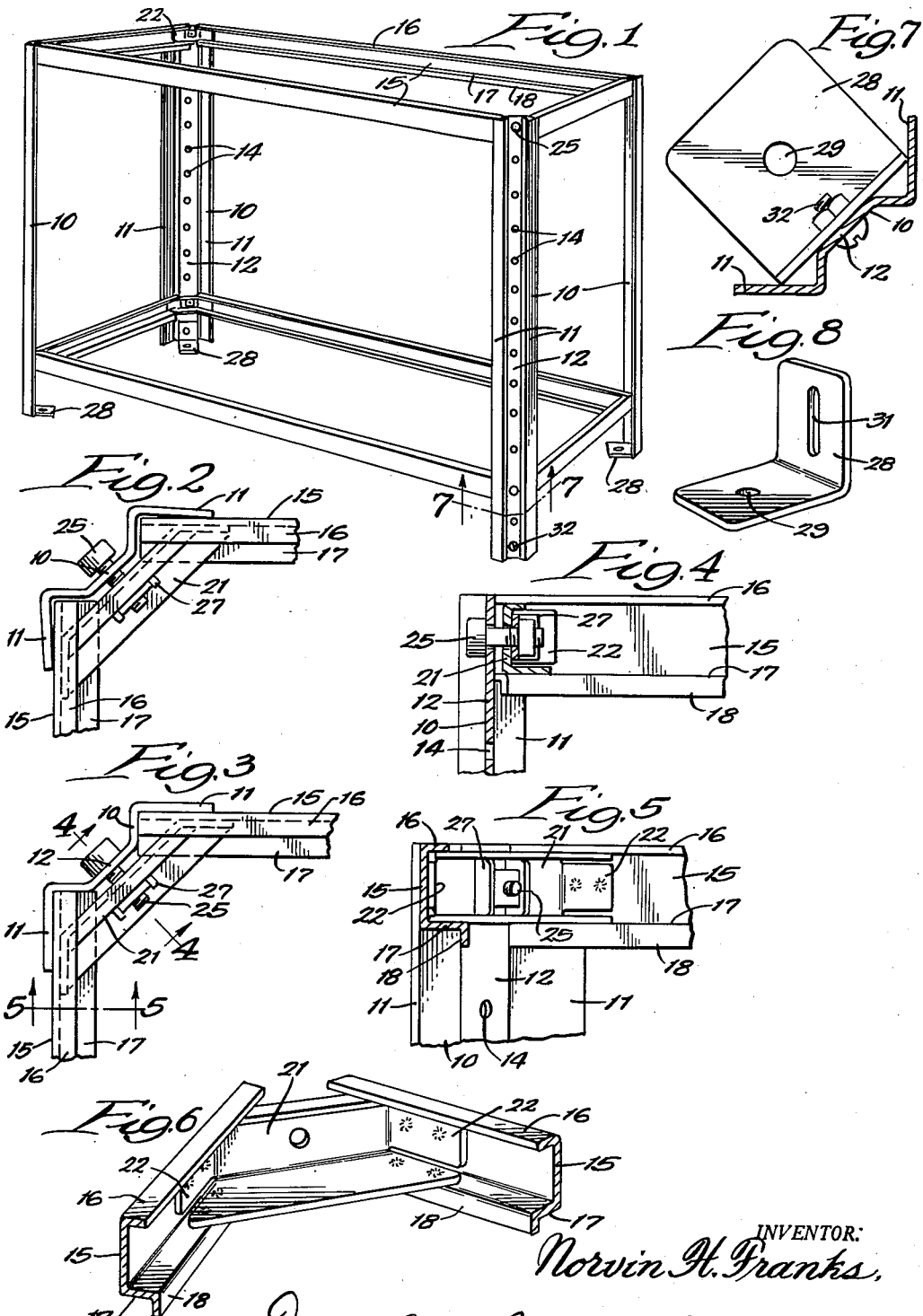

2,588,818

UNITED STATES PATENT OFFICE 2,588,818

TENSION BOLTED FRAME CONSTRUCTION

Norvin H. Franks, Chicago, Ill.

Application June 8, 1950, Serial No. 166,963

2 Claims. (Cl. 311—113)

This invention relates to tension bolted frame constructions and more particularly to framing or shelving units which can be shipped in knocked down or disassembled condition and assembled at the desired point of use.

In many types of units used both domestically and in commercial establishments it is desirable that the several parts of the unit be easily separable for shipment in a knocked down condition or for temporary assembly for temporary use. Among the types of units of which this is especially true are tables and stands of various sorts, open frameworks to be utilized as tool supports or for other purposes and shelving units. The present invention relates generally to frame constructions of this character and particularly to a fastening construction by which such units can easily and quickly be assembled or disassembled.

It is one of the objects of the invention to provide a frame construction including legs and connector elements in which a simple joint construction for connecting the connector elements rigidly and securely to the legs is provided. The preferred construction provides a very rigid connection so that the resulting framework, table, shelving or the like will be extremely rigid when assembled.

Another object is to provide a frame construction in which each joint is formed by a single tension connection such as a bolt or the like.

Another object is to provide a frame construction in which the parts resiliently engage each other so that they will be held tightly together to form a rigid structure when assembled. In the preferred construction the legs have resilient flange portions which engage the connector elements and are deflected thereby during assembly.

Still another object is to provide a frame construction which can be formed entirely of sheet material such as sheet metal and which will form an extremely rigid, strong unit when assembled.

The above and other objects and advantages of the invention will be more readily apparent when read in connection with the accompanying drawings, in which—

Figure 1 is a perspective view of a frame construction embodying the invention;

Figure 2 is a partial plan view illustrating the manner of connecting the legs and horizontal frame elements, the parts being shown in partially assembled position;

Figure 3 is a view similar to Figure 2 showing the parts in fully assembled position;

Figure 4 is a partial section on the line 4—4 of Figure 3;

Figure 5 is a partial section on the line 5—5 of Figure 3;

Figure 6 is a perspective view showing a corner of the connector members;

Figure 7 is a partial section on the line 7—7 of Figure 1; and

Figure 8 is a perspective view of the foot member illustrated in Figure 7.

The frame construction illustrated as one example of a structure in which the invention may be employed includes four vertical legs 10 which may be identical. Each leg, as best seen in Figure 2, is formed of sheet metal with edge flanges 11 which lie at an angle to each other determined by the desired shape of the unit. In the rectangular unit shown, the flanges 11 are normally at an angle slightly less than a right angle to each other for a purpose to appear hereinafter. Between the flanges the central part of the leg is pressed inward to form a central panel 12 connected to the flanges by shoulders which lie at substantially right angles to the respective flanges and which are spaced inward from the outer edges thereof. The central panel 12 is provided with a series of bolt receiving openings 14 preferably spaced throughout the length of the leg, as seen in Figure 1, for assembly of the connector members at different desired levels.

A plurality of sets of connector or frame members may be supported by the legs, there being two such sets in the example shown, although more or less could be used, as desired. Each set of connector members is formed of four sheet metal channels each of which has a center vertical web 15 with an upper short horizontal flange 16 and a wider bottom flange 17. The flange 17 terminates in a downturned edge flange 18 to form a shape as more particularly described and claimed in my copending application Serial No. 115,815 filed September 15, 1949, although it will be understood that plain channel shaped strips could be employed or that shelf plates with channel shaped edges could be used. Each channel terminates in a square edge to abut against one of the shoulders.

The channels are joined at the corners of each set by channel section corner units each of which includes a central web 21 extending between adjacent channels with its ends bent over as indicated at 22 to fit against and be welded to the channel webs 15. At its upper edge the corner unit is formed with a short top flange which under lies and may be welded to the flange 16. At its lower edge the corner unit has a wider flange overlying and welded to the flange 17. In this way the channels are rigidly joined with their ends 19 properly spaced to engage the shoulders 13 of a leg.

To assemble the unit, a set of connector members is placed in alignment with the desired series of holes 14 to position it at the desired level. Tension fastenings such as bolts 25 are then inserted through the selected opening 14 in each leg and through a registering opening in the central part of the corner unit 21. Nuts are fitted on the bolts and may be held against turning by flanged nut holders 27.

When the parts are initially assembled and before the bolts are tightened they will occupy the position shown in Figure 2. Since the leg flanges 11 lie at an angle less than a right angle and the outer surfaces of the channels are at a right angle, only the outer edges of the flanges will initially engage the channels and the square ends of the channels will be slightly spaced from the shoulders. Preferably the legs are formed of a fairly stiff resilient material so that a high degree of tension will be required in the bolt 25 to draw the parts together. When the bolt is tightened the flanges 11 will spring outward and the square ends of the channels will engage the shoulders at the same time that the flanges 11 are drawn flat against the outsides of the channels.

With this construction the flanges 11 press tightly against the channels with a resilient force to hold the parts under tension at all times. This produces an extremely rigid and tight structure which will remain right and rigid in use and which will remain tight even when subject to vibration. The structure is held rigidly both by pressure of the flanges 11 against the channels and by the engagement of the square ends of the channels against the shoulders so that the legs and channels brace and support each other against any distortion or twisting.

When two or more sets of connectors are employed, as shown the structure is extremely rigid and is highly resistant to lateral loads. The shape of the legs makes then quite rigid in bending between the points of attachment of the cross members such as the channels and further contributes to stability and rigidity. It is also to be noted that this high degree of rigidity is obtained by the use of a single tension fastening at each connecting point of the channel elements with the legs.

At the bottoms of the legs foot members are preferably provided to increase the bearing on the floor and to permit fastening of the unit when desired. As shown, each foot member comprises a right angularly bent piece of sheet metal 28 formed in one of its arms with a round opening 29 to receive a screw or bolt to fasten it to the floor and in its other arm with an elongated slot 31. In attaching the foot member to a leg, the arm thereof containing the slot 31 is placed against the central projecting portion 12 of the leg with its edges abutting the flanges 11, as best seen in Figure 7. A bolt or similar tension fastening 32 may then be inserted through the end most opening 14 in the leg and through the slot 31. When the bolt is tightened, the foot member will be rigidly secured to the leg and may be adjusted vertically by sliding the bolt member in the slot 31 to accommodate irregular or uneven floors.

While one embodiment of the invention has been shown and described in detail herein, it will be understood that this is illustrative only and is not to be taken as a definition of the scope of the invention, reference being had for this purpose to the appended claims.

What is claimed is:

1. In a tension bolted frame construction, a leg formed of sheet metal, said leg comprising flat edge flanges lying at an angle to each other, integral flat shoulders projecting inward at right angles to the flanges at points spaced from the edges of the flanges, and a central flat panel integrally joining the inner edges of the shoulders, elongated elements lying at substantially the same angle to each other as the flanges and terminating in straight ends of substantially the same thickness as the shoulders and at right angles to the outer surfaces of said elements respectively to engage the shoulders respectively with their outer surfaces against the inner flat surfaces of the flanges, a connector joining the elongated elements and extending between the elements adjacent to the ends thereof, and a tension fastening connecting the central part of the leg to the connector and drawing the ends of the elements into abutting relationship with the shoulders and the outer surfaces of the elongated elements against the flanges.

2. In a tension bolted frame construction, a leg formed of resilient sheet material, said leg comprising flat edge flanges lying at an angle to each other and with an inwardly projecting central portion defining flat shoulders at right angles to the flanges, elongated elements lying at a greater angle to each other than the flanges and terminating in straight ends of substantially the same thickness as the shoulders and at right angles to the outer surfaces of the elements respectively to engage the shoulders respectively with their outer surfaces against the inner flat surfaces of the flanges, a connector strip joining the elongated elements adjacent to but spaced from their ends, and a tension fastening joining the central part of the leg with the central part of the connector strip and drawing the ends of the elements into abutting relationship with the shoulders and springing the flanges out into flat abutting relationship with the outer surfaces of the elements.

NORVIN H. FRANKS.

REFERENCES CITED

The following references are of record in the file of this patent:

UNITED STATES PATENTS

| Number | Name | Date |
|---|---|---|
| 1,667,913 | Weston | May 1, 1928 |
| 1,870,173 | Calton | Aug. 2, 1932 |
| 2,302,439 | Greitzer | Nov. 17, 1942 |
| 2,485,784 | Shoenberg | Oct. 25, 1949 |